(12) United States Patent
Jeong

(10) Patent No.: US 11,794,578 B2
(45) Date of Patent: Oct. 24, 2023

(54) INTEGRATED CONTROL APPARATUS FOR DRIVING VEHICLE

(71) Applicants: HYUNDAI MOTOR COMPANY, Seoul (KR); KIA CORPORATION, Seoul (KR)

(72) Inventor: Won Jin Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 179 days.

(21) Appl. No.: 17/388,986

(22) Filed: Jul. 29, 2021

(65) Prior Publication Data
US 2022/0305908 A1 Sep. 29, 2022

(30) Foreign Application Priority Data
Mar. 23, 2021 (KR) .......................... 10-2021-0037341

(51) Int. Cl.
*B60K 26/02* (2006.01)
*B60T 7/10* (2006.01)
(Continued)

(52) U.S. Cl.
CPC ............ *B60K 26/021* (2013.01); *B60T 7/102* (2013.01); *B62D 1/12* (2013.01); *F16H 59/12* (2013.01);
(Continued)

(58) Field of Classification Search
CPC .................. B60K 26/02; B60K 26/021; B60K 2026/022; B60K 2026/023;
(Continued)

(56) References Cited

U.S. PATENT DOCUMENTS

| 6,446,747 B1* | 9/2002 | Muller ................... B62D 1/12 |
| | | 180/332 |
| 10,520,973 B2* | 12/2019 | Parazynski ........ G05G 9/04788 |
| 2004/0204811 A1* | 10/2004 | Huang .................... G05G 5/03 |
| | | 701/50 |
| 2007/0144799 A1* | 6/2007 | Vasant ................ B62D 31/003 |
| | | 180/65.1 |

(Continued)

FOREIGN PATENT DOCUMENTS

| JP | H 09-301193 A | 11/1997 |
| JP | H 11-154029 A | 6/1999 |

(Continued)

OTHER PUBLICATIONS

Machine Translation of JP H11-154029.*
Machine Translation of KR 10-0481813.*

*Primary Examiner* — Richard W Ridley
*Assistant Examiner* — Brian J McGovern
(74) *Attorney, Agent, or Firm* — Fox Rothschild LLP

(57) ABSTRACT

An integrated control apparatus for driving a vehicle is provided. The apparatus includes a lever housing mounted in an interior space of the vehicle; a joystick lever coupled to the lever housing and configured to be rotatable in a forward-backward direction and a leftward-rightward direction; and a gentle acceleration lever coupled to the joystick lever and configured to be rotatable in the forward-backward direction. When the gentle acceleration lever is operated, a gentle acceleration signal of the vehicle is generated, and when the joystick lever is operated, one of a sudden acceleration signal, a deceleration signal, a steering signal, or a braking signal of the vehicle is generated.

12 Claims, 8 Drawing Sheets

(51) Int. Cl.
  *F16H 59/12* (2006.01)
  *B62D 1/12* (2006.01)
(52) U.S. Cl.
  CPC .. *B60K 2026/023* (2013.01); *B60K 2026/029* (2013.01)
(58) Field of Classification Search
  CPC ........ B60K 2026/029; B60K 2026/046; G05G 9/047; G05G 9/04788; G05G 2009/04703; G05G 2009/04714; G05G 2009/0474; G05G 2009/04748; G05G 2009/04755; G05G 2009/04766; G05G 2009/04774; G05G 1/04; F16H 59/12; B60T 7/08; B60T 7/102; B62D 1/12
  See application file for complete search history.

(56) References Cited

U.S. PATENT DOCUMENTS

| | | | | |
|---|---|---|---|---|
| 2017/0050721 | A1* | 2/2017 | Voiles | F16H 19/04 |
| 2018/0356907 | A1* | 12/2018 | Parazynski | G06F 3/0338 |
| 2020/0290634 | A1 | 9/2020 | Schubert et al. | |
| 2020/0324773 | A1* | 10/2020 | Kim | B60K 26/02 |
| 2021/0163114 | A1* | 6/2021 | Bondesson | G05G 9/04788 |

FOREIGN PATENT DOCUMENTS

| | | |
|---|---|---|
| JP | 2002-160642 A | 6/2002 |
| JP | 2008-090773 A | 4/2008 |
| JP | 6594708 B2 | 10/2019 |
| KR | 10-0481813 B1 | 4/2005 |
| KR | 10-1166895 B1 | 7/2012 |

* cited by examiner

INTEGRATED CONTROL APPARATUS FOR DRIVING VEHICLE

CROSS-REFERENCE TO RELATED APPLICATION

This application claims the priority to and the benefit from Korean Patent Application No. 10-2021-0037341, filed on Mar. 23, 2021, the disclosure of which is incorporated herein by reference in its entirety.

TECHNICAL FIELD

The present disclosure relates to an integrated control apparatus for driving a vehicle, and more particularly to an integrated control apparatus for driving a vehicle, which enables acceleration, deceleration, braking, and steering of a vehicle through operation of a joystick lever.

BACKGROUND

An autonomous vehicle is a kind of smart vehicle, which travels autonomously, specifically, which is capable of autonomously travelling to a set destination by itself without manipulation of the steering wheel, the accelerator, the brake, or the like by a driver.

When such an autonomous vehicle is commercialized, a driver can select a manual driving mode, in which the driver manually drives the vehicle, and an autonomous driving mode, in which the vehicle autonomously travels to a destination by itself without driving manipulation on the part of the driver.

However, when an emergency situation occurs in an autonomous driving state, one of the occupants of the vehicle needs to manually drive the vehicle. To this end, the vehicle is equipped with apparatuses that are manipulated by a user to realize a manual driving mode.

In a conventional vehicle, an accelerator pedal, a brake pedal, a steering wheel, and a shift lever (or button) are independently constructed and are separately located at individual positions. Therefore, it is not easy for a driver to manipulate these devices in an emergency situation in which the driver needs to manually drive the vehicle in an autonomous driving state.

Further, in a conventional vehicle, an accelerator pedal, a brake pedal, a steering wheel, and a shift lever occupy a large area in the interior space of the vehicle, which greatly reduces the degree of freedom in design of the vehicle. Therefore, there is the need for a novel integrated control apparatus for an autonomous vehicle in order to maximize utilization of the interior space of the vehicle.

The information disclosed in this Background section is only for enhancement of understanding of the general background of the disclosure, and should not be taken as an acknowledgement or any form of suggestion that this information forms the related art already known to a person skilled in the art.

SUMMARY

The present disclosure provides an integrated control apparatus for driving a vehicle, which enables acceleration, deceleration, braking, and steering of a vehicle through operation of a joystick lever by a user when the user desires to manually drive the vehicle in an autonomous driving mode.

The present disclosure also provides an integrated control apparatus for driving a vehicle, which is easily operated by a user, thereby improving user convenience.

In one form of the present disclosure, the above and other objects can be accomplished by the provision of an integrated control apparatus for driving a vehicle, the integrated control apparatus including a lever housing mounted so as to be located in the interior space of the vehicle, a joystick lever coupled to the lever housing so as to be rotatable in forward-backward and leftward-rightward directions, and a gentle acceleration lever coupled to the joystick lever so as to be rotatable in the forward-backward direction. When the gentle acceleration lever is operated, a gentle acceleration signal of the vehicle is generated, and when the joystick lever is operated, one of a sudden acceleration signal, a deceleration signal, a steering signal, and a braking signal of the vehicle is generated.

The integrated control apparatus may further include a steering hinge coupled to the lever housing so as to be rotatable in the leftward-rightward direction. The joystick lever may be connected to the steering hinge and may be rotated in the leftward-rightward direction together with the steering hinge with respect to the lever housing.

The integrated control apparatus may further include an acceleration hinge coupled to the steering hinge so as to be rotatable in the forward-backward direction. The joystick lever may be connected to the acceleration hinge and may be rotated in the forward-backward direction together with the acceleration hinge with respect to the steering hinge.

The integrated control apparatus may further include a motor connected to the steering hinge via a reduction gear to provide operating force and reaction force when the joystick lever is rotated in the leftward-rightward direction.

The integrated control apparatus may further include steering-sensor permanent magnets, one of the steering-sensor permanent magnets being coupled to an end of the steering hinge and the remaining one of the steering-sensor permanent magnets being coupled to an end of a motor shaft, and a steering-sensor printed circuit board (PCB) fixedly mounted in the lever housing so as to face the steering-sensor permanent magnets. When the joystick lever is rotated in the leftward-rightward direction, the steering-sensor PCB may recognize a change in magnetic flux depending on a change in position of the steering-sensor permanent magnets, and may generate a steering-related signal.

The integrated control apparatus may further include a lever gear rotatably coupled to the joystick lever, the lever gear meshing with the gentle acceleration lever in an external gear form, a first acceleration-sensor permanent magnet coupled to the lever gear, and an acceleration-sensor PCB fixedly mounted to the joystick lever so as to face the first acceleration-sensor permanent magnet. When the gentle acceleration lever is rotated, the acceleration-sensor PCB may recognize a change in magnetic flux depending on a change in position of the first acceleration-sensor permanent magnet, and may generate a signal related to gentle acceleration.

The integrated control apparatus may further include a second acceleration-sensor permanent magnet coupled to the acceleration hinge, the second acceleration-sensor permanent magnet being mounted so as to face the acceleration-sensor PCB. When the joystick lever is rotated in the forward-backward direction, the acceleration-sensor PCB may recognize a change in magnetic flux depending on a change in position of the second acceleration-sensor permanent magnet, and may generate one of an acceleration-related signal, a deceleration-related signal, and a braking-related signal.

The integrated control apparatus may further include a main PCB fixedly mounted in the lever housing. The main PCB may control operation of the motor, and may receive signals from the steering-sensor PCB and the acceleration-sensor PCB and may transmit the signals to an actuator of the vehicle.

The integrated control apparatus may further include a lever pin coupled to the lower end of the joystick lever in the leftward-rightward direction, a carrier rotatably coupled at one end thereof to the steering hinge, the carrier having a groove formed in a wave shape in the lower surface thereof that is in contact with the lever pin, and a carrier spring, the two opposite ends of the carrier spring being supported by the steering hinge and the carrier, the carrier spring providing elastic force to the carrier to maintain contact between the lever pin and the groove.

The joystick lever may be mounted so as to be located on the left side or the right side of the driver. In the case in which the joystick lever is located on the left side of the driver, when the driver pulls and rotates the joystick lever toward the body of the driver, a right directional signal may be generated. In the case in which the joystick lever is located on the right side of the driver, when the driver pulls and rotates the joystick lever toward the body of the driver, a left directional signal may be generated.

The joystick lever may include a joystick lever mounted on the left side of the driver and a joystick lever mounted on the right side of the driver, and the joystick lever mounted on the left side of the driver and the joystick lever mounted on the right side of the driver may be moved in conjunction with each other.

The integrated control apparatus may further include a shift button provided in the lever housing. When the driver presses and operates the shift button, the main PCB mounted in the lever housing may generate a shift signal corresponding to the pressed shift button.

When the joystick lever is pushed and rotated forwards from the neutral position, acceleration may be performed. When the force of pushing the joystick lever forwards is removed, the joystick lever may be returned to the neutral position and deceleration may be performed. When the joystick lever is pulled and rotated backwards from the neutral position, braking may be performed.

When the joystick lever is pushed and rotated forwards from the neutral position, forward acceleration may be performed. When the force of pushing the joystick lever forwards is removed, the joystick lever may be returned to the neutral position and forward deceleration may be performed. When the joystick lever is pulled and rotated backwards from the neutral position, backward acceleration may be performed. When the force of pulling the joystick lever backwards is removed, the joystick lever may be returned to the neutral position and backward deceleration may be performed.

In the case in which backward acceleration is performed when the joystick lever is pulled and rotated backwards from the neutral position, an emergency brake button configured to be operated by the driver for braking of the vehicle may be separately provided in the lever housing. When the driver presses and operates the emergency brake button, the main PCB mounted in the lever housing may generate a braking-related signal.

DRAWINGS

The above and other objects, features and other advantages of the present disclosure will be more clearly understood from the following detailed description taken in conjunction with the accompanying drawings, in which.

Figure 7:
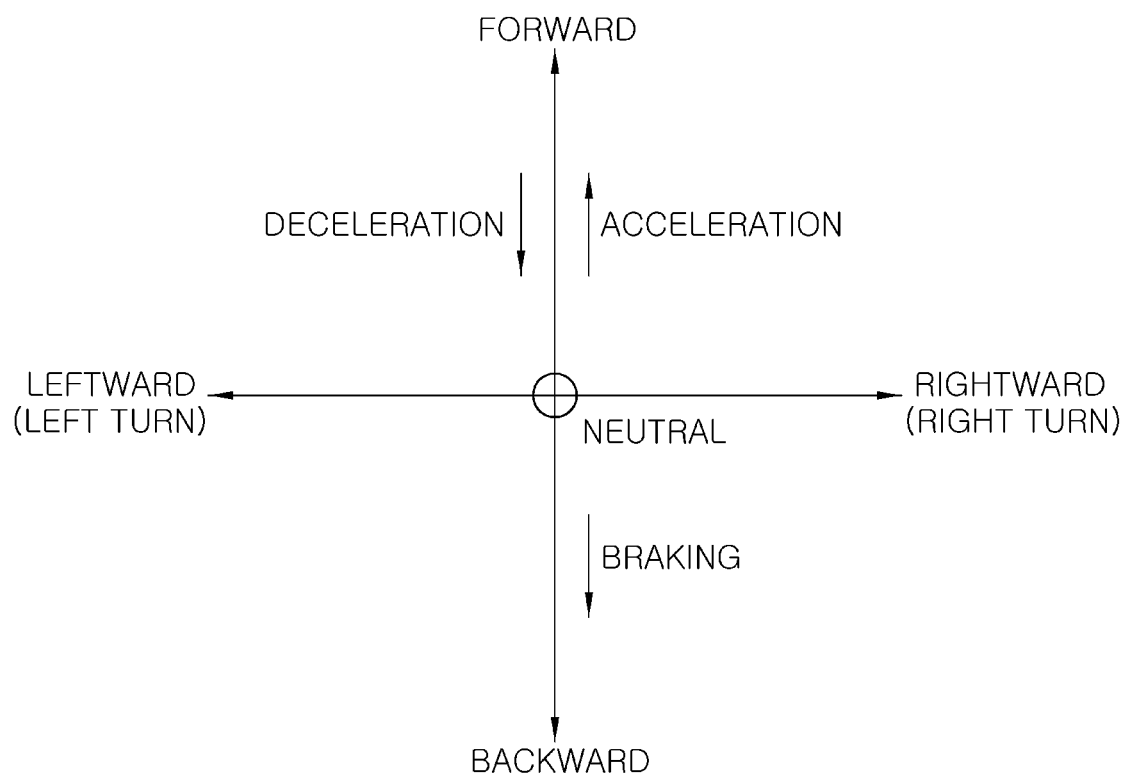
Figure 8:
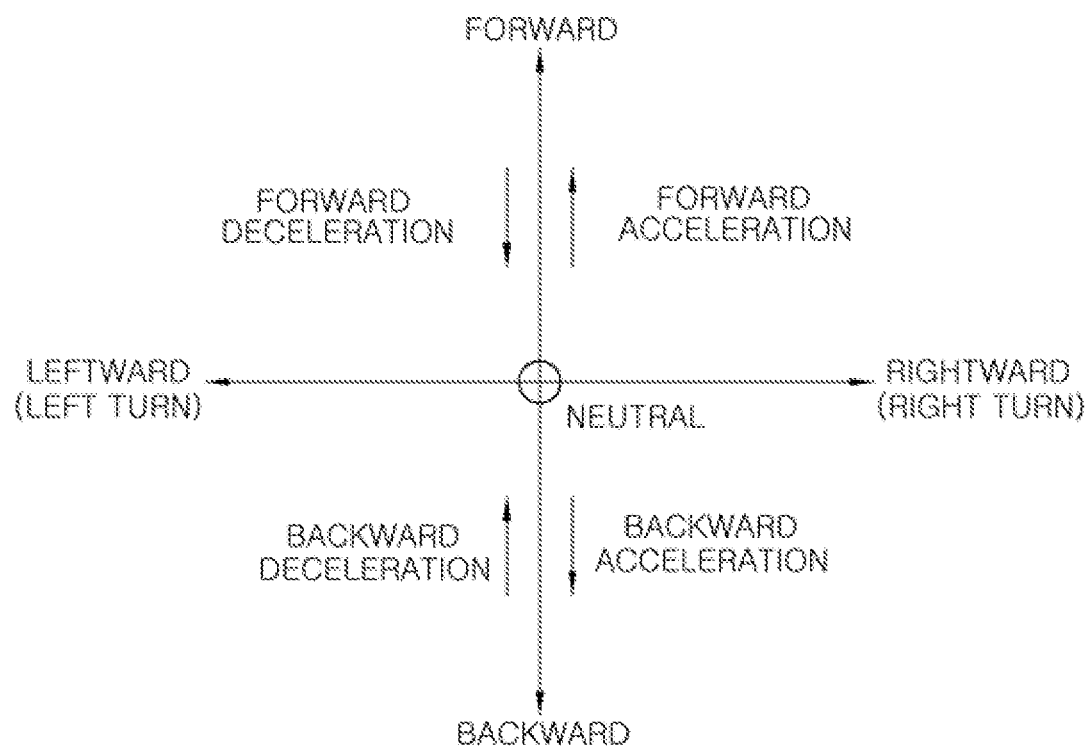

FIG. 7 is a diagram schematically showing the operation of a first form in which acceleration, deceleration, and braking are performed when the joystick lever in one form of the present disclosure is operated; and FIG. 8 is a diagram schematically showing the operation of a second form in which forward acceleration, backward acceleration, forward deceleration, and backward deceleration are performed when the joystick lever in one form of the present disclosure is operated.

DETAILED DESCRIPTION

Various exemplary forms will now be described more fully with reference to the accompanying drawings, in which only some exemplary forms are shown. Specific structural and functional details disclosed herein are merely representative for the purpose of describing exemplary forms. The present disclosure, however, may be embodied in many alternative forms, and should not be construed as being limited to the exemplary forms set forth herein.

Accordingly, while exemplary forms of the disclosure are capable of being variously modified and taking alternative forms, forms thereof are shown by way of example in the drawings and will herein be described in detail. It should be understood, however, that there is no intent to limit the present disclosure to the particular exemplary forms disclosed. On the contrary, exemplary forms are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary forms of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular forms only and is not intended to be limiting of exemplary forms of the disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

A control unit (controller) in some forms of the present disclosure may be implemented through a processor (not shown) configured to execute the operations to be described below using a nonvolatile memory (not shown), which is configured to store an algorithm for controlling the operation of various components of a vehicle or data related to a software command for executing the algorithm, and using data stored in the corresponding memory. Here, the memory and the processor may be implemented as respective chips. Alternatively, the memory and the processor may be implemented as a single integrated chip. The processor may alternatively take the form of one or more processors.

Hereinafter, an integrated control apparatus for driving a vehicle in some forms of the present disclosure will be described with reference to the accompanying drawings.

The integrated control apparatus for driving a vehicle in some forms of the present disclosure is applied to an autonomous vehicle, and is directly operated and used by a driver when the driver drives the vehicle in a manual driving mode.

As shown in FIGS. 1 to 8, the integrated control apparatus for driving a vehicle in some forms of the present disclosure includes a lever housing 100 mounted so as to be located in the interior space of the vehicle, a joystick lever 200 coupled to the lever housing 100 so as to be rotatable in forward-backward and leftward-rightward directions, and a gentle acceleration lever 300 coupled to the joystick lever 200 so as to be rotatable in the forward-backward direction.

When the driver operates the gentle acceleration lever 300, a gentle acceleration signal of the vehicle is generated, and when the driver operates the joystick lever 200, one of a sudden acceleration signal, a deceleration signal, a steering signal, and a braking signal of the vehicle is generated.

As for the gentle acceleration signal of the vehicle, an acceleration-sensor PCB, which will be described later, recognizes a change in magnetic flux depending on a change in position of a first acceleration-sensor permanent magnet, and generates a signal related to gentle acceleration based thereon.

The acceleration-sensor PCB, which will be described later, recognizes a change in magnetic flux depending on a change in position of a second acceleration-sensor permanent magnet, and generates the sudden acceleration signal, the deceleration signal, the steering signal, and the braking signal of the vehicle based thereon.

The gentle acceleration means that the vehicle is slowly and gradually accelerated. In the gentle acceleration, the vehicle is accelerated to about 25% to 30% of the level corresponding to full acceleration. It is possible to finely control the acceleration of the vehicle when the vehicle is gently accelerated.

The integrated control apparatus may be equipped with control logic by which not only the sudden acceleration signal but also an intermediate acceleration signal is generated as needed when the joystick lever 200 is operated.

The user holds the joystick lever 200 with one hand, and rotates the joystick lever 200 in the forward-backward direction or the leftward-rightward direction to operate the same.

Figure 1:
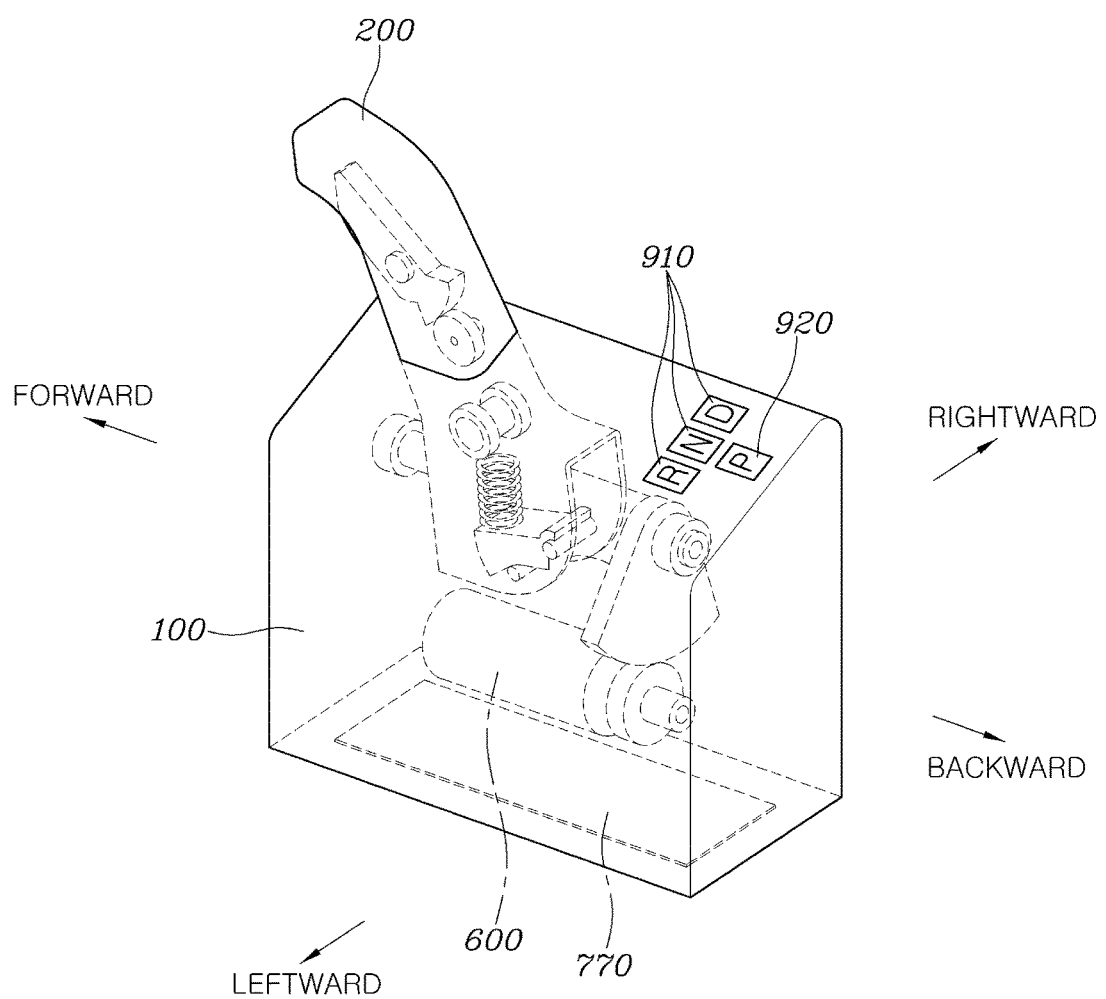
FIG. 1 is a perspective view of an integrated control apparatus for driving a vehicle in one form of the present disclosure.
Figure 2:
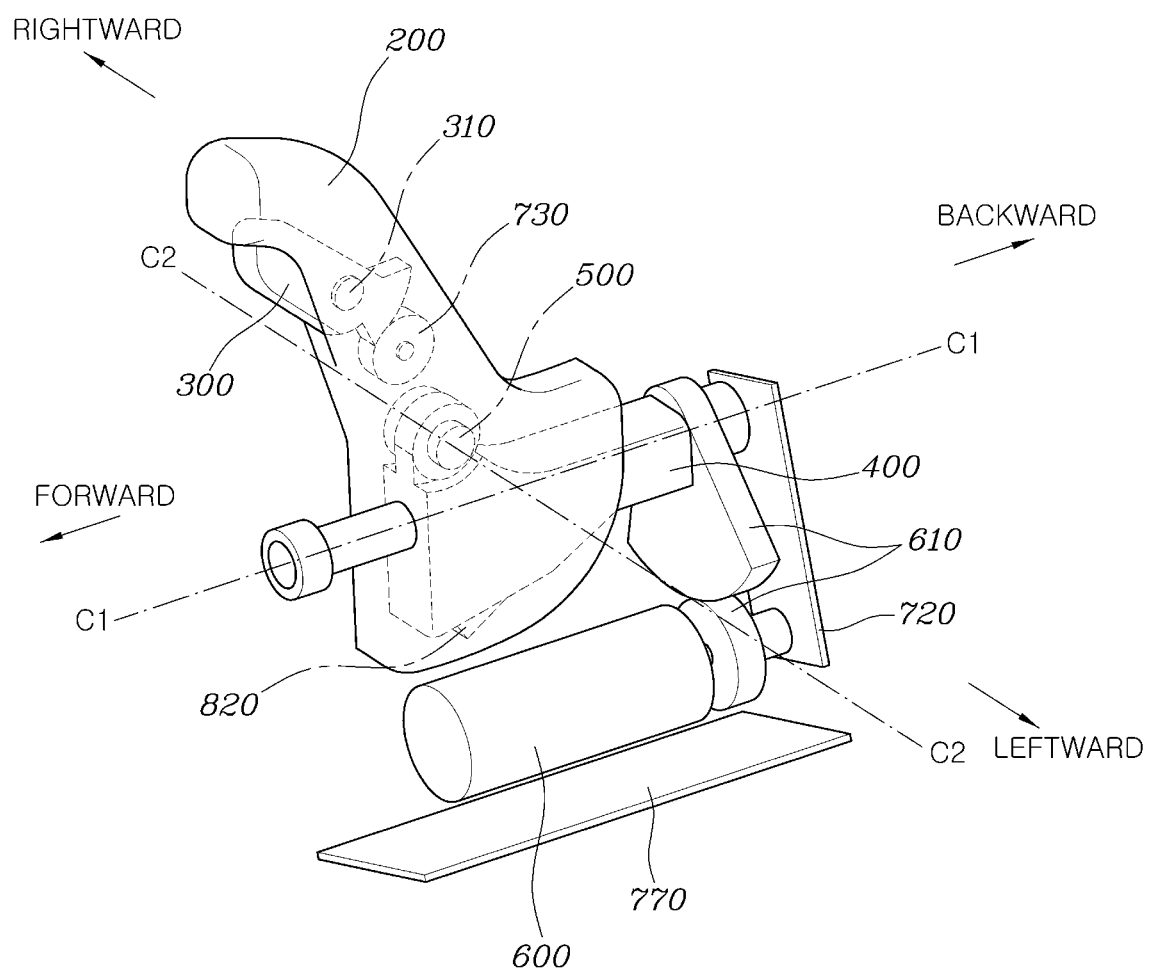
FIG. 2 is a view of the integrated control apparatus shown in FIG. 1 from which a lever housing is removed.
Figure 3:
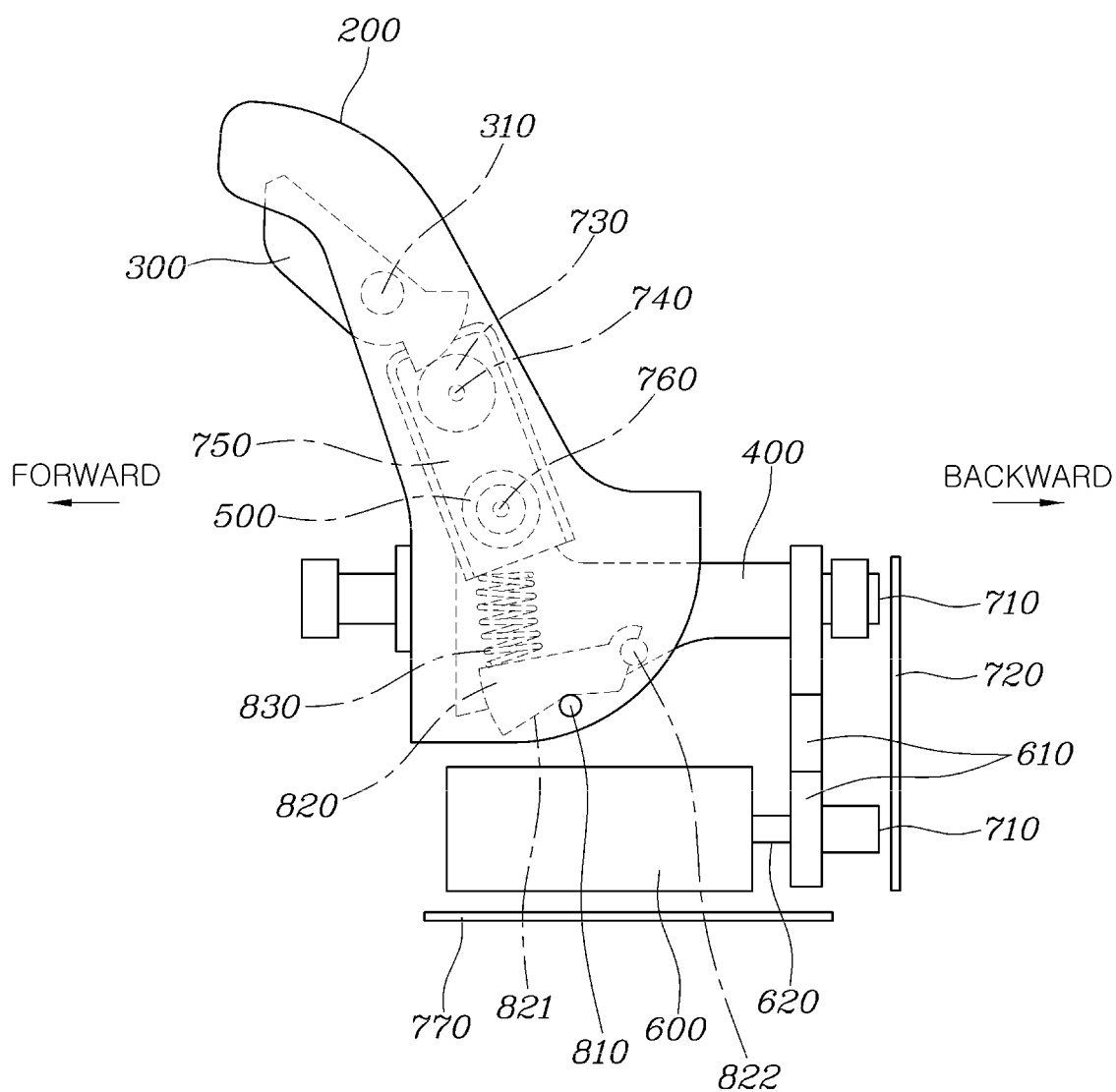
FIG. 3 is a side view of the integrated control apparatus shown in FIG. 2.
Figure 4:
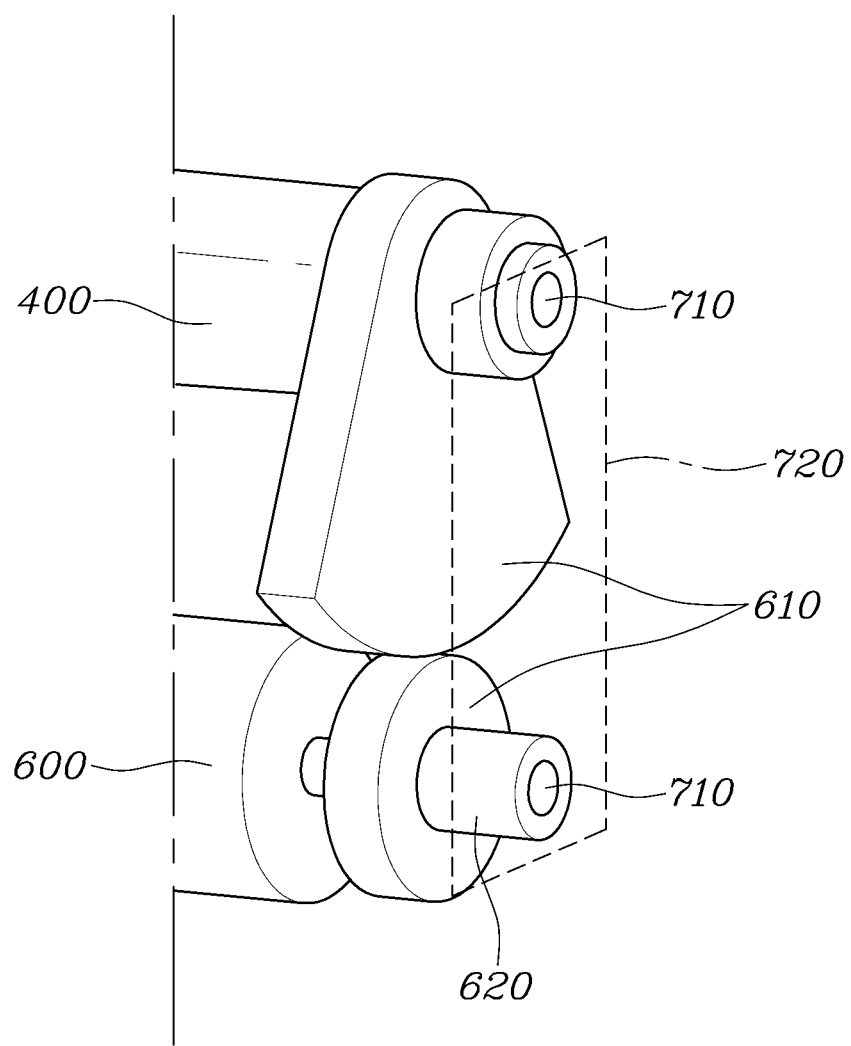
FIG. 4 is a view showing steering-sensor permanent magnets and a steering-sensor PCB in one form of the present disclosure.
Figure 5:
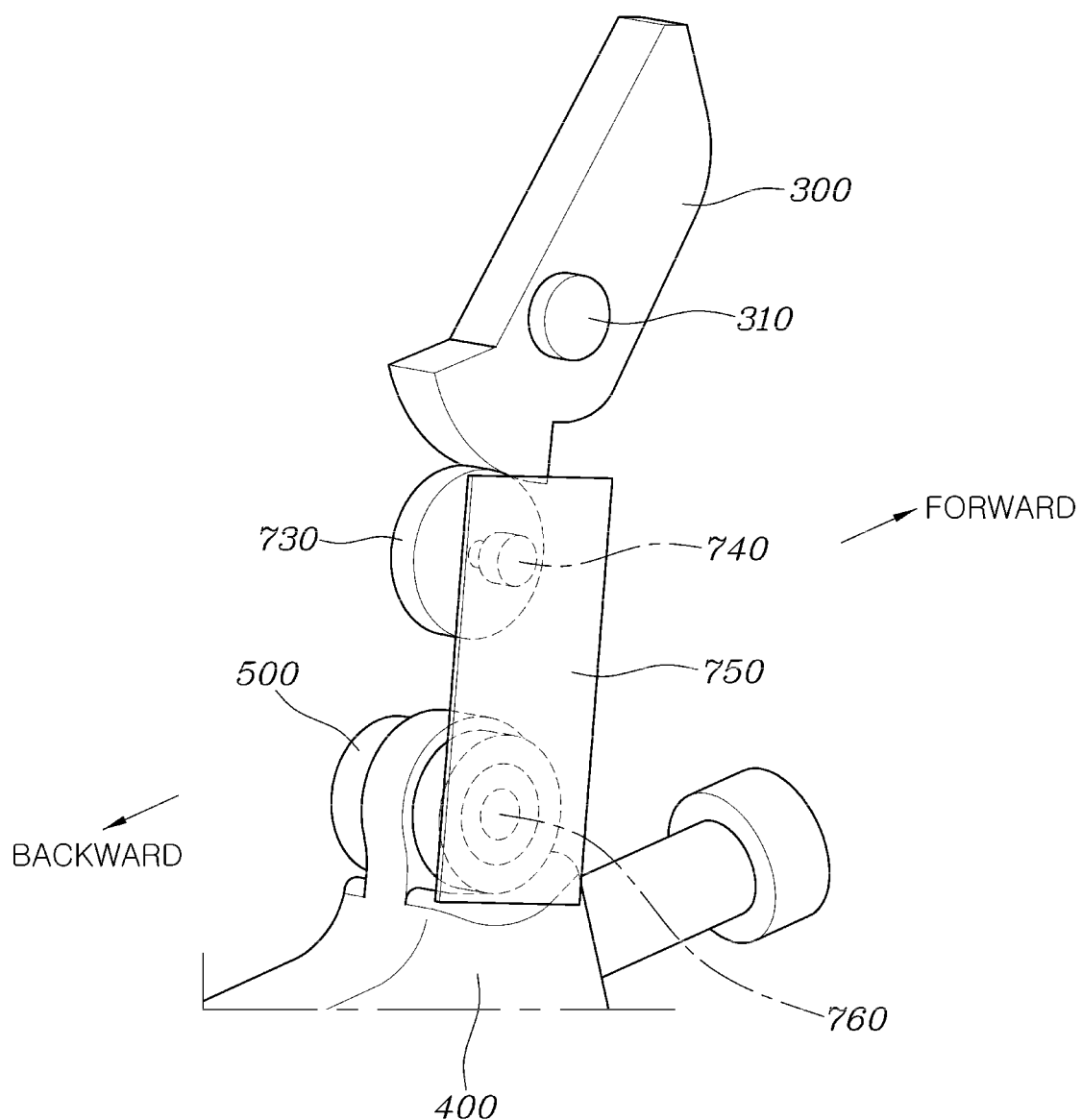
FIG. 5 is a view showing a first acceleration-sensor permanent magnet, a second acceleration-sensor permanent magnet, and an acceleration-sensor PCB in one form of the present disclosure.
Figure 6:
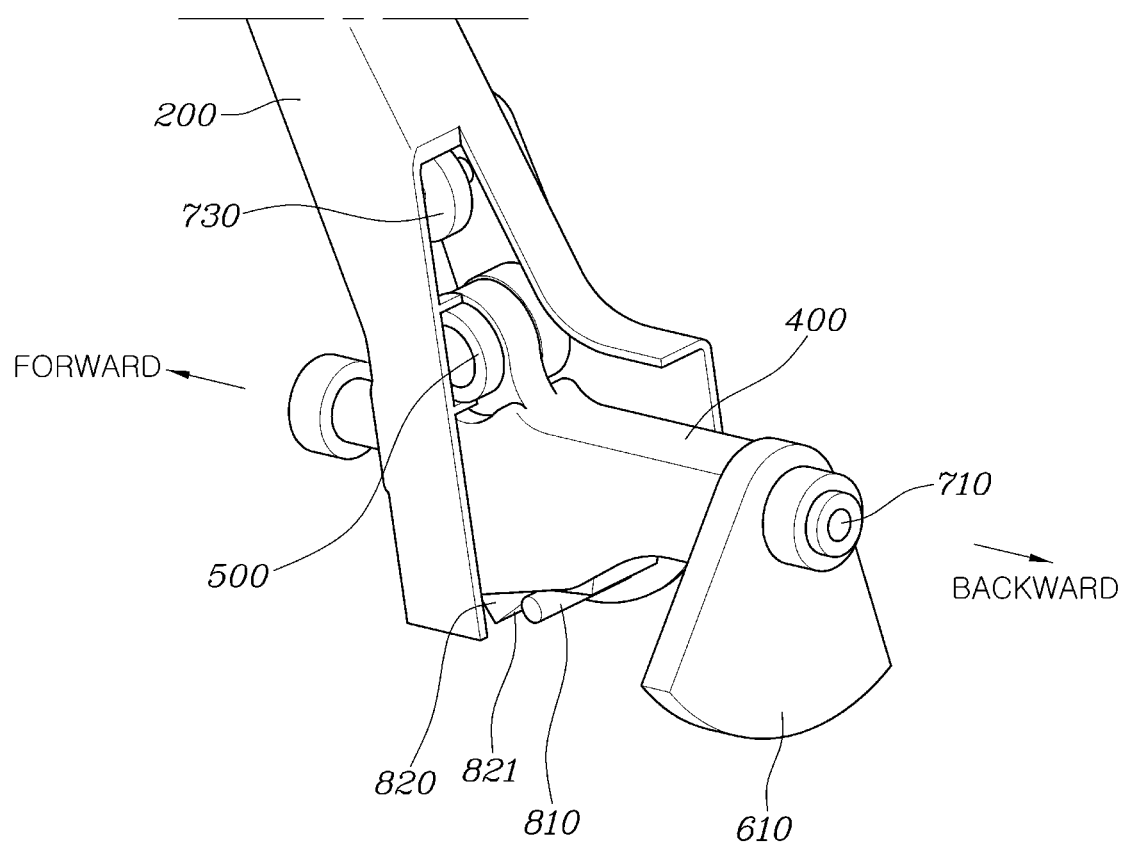
FIG. 6 is a partially-cut perspective view showing the lower end portion of a joystick lever in one form of the present disclosure.

In FIG. 2, reference numeral C1 denotes the central axis of the joystick lever 200 in the leftward-rightward direction, and reference numeral C2 denotes the central axis of the joystick lever 200 in the forward-backward direction.

The gentle acceleration lever 300 is integrally provided with a lever hinge 310. The lever hinge 310 is coupled to the joystick lever 200 so as to be rotatable in the forward-backward direction. Accordingly, the driver pushes and operates the gentle acceleration lever 300 using a finger (index finger) of the hand holding the joystick lever 200. When operated, the gentle acceleration lever 300 is rotated about a lever hinge 310 in the forward-backward direction with respect to the joystick lever 200.

The lever hinge 310 is provided with a lever spring. The two opposite ends of the lever spring are supported by the gentle acceleration lever 300 and the joystick lever 200. Thus, when the force of operating the gentle acceleration lever 300 is removed, the gentle acceleration lever 300 is returned to the original position thereof by the elastic force of the lever spring.

The integrated control apparatus in some forms of the present disclosure further includes a steering hinge 400, coupled to the lever housing 100 so as to be rotatable in the leftward-rightward direction, and an acceleration hinge 500, coupled to the steering hinge 400 so as to be rotatable in the forward-backward direction.

The steering hinge 400 is disposed in the forward-backward direction, and the two opposite ends thereof are coupled to the lever housing 100 so as to be rotatable in the leftward-rightward direction. The acceleration hinge 500 is coupled to the front upper end portion of the steering hinge 400 so as to penetrate the same in the leftward-rightward direction and to be rotatable in the forward-backward direction. The acceleration hinge 500 is coupled to the joystick lever 200 so as to be integrated therewith.

In addition, the lower side of the portion of the joystick lever 200 to which the acceleration hinge 500 is coupled is formed as a recess that is open downwards and backwards. The body portion of the steering hinge 400 is inserted into this recess, and the front end of the steering hinge 400 penetrates the front surface of the joystick lever 200.

Therefore, the joystick lever 200 is connected to the steering hinge 400 via the acceleration hinge 500. When the driver holds the joystick lever 200 with one hand and operates the same in the leftward-rightward direction, the joystick lever 200 is rotated in the leftward-rightward direction together with the acceleration hinge 500 and the steering hinge 400 with respect to the lever housing 100.

In addition, since the acceleration hinge 500 is coupled to the joystick lever 200 so as to be integrated therewith, when the driver holds the joystick lever 200 with one hand and operates the same in the forward-backward direction, the joystick lever 200 is rotated in the forward-backward direction together with the acceleration hinge 500 with respect to the steering hinge 400.

The upper side of the portion of the joystick lever 200 to which the acceleration hinge 500 is coupled is formed such that the lever hinge 310 provided at the gentle acceleration lever 300 is inserted into the inner space in the joystick lever 200 so as to be rotatable, and a lever gear, which will be described later, is rotatably mounted between the lever hinge 310 and the acceleration hinge 500.

The integrated control apparatus in some forms of the present disclosure further includes a motor 600, which is connected to the steering hinge 400 via a reduction gear 610 in order to provide operating force and reaction force when the joystick lever 200 is rotated in the leftward-rightward direction.

The motor is a brushless direct current (BLDC) motor, and serves to provide reaction force to the joystick lever 200 to enable precise operation of the joystick lever 200 when the joystick lever 200 is rotated in the leftward-rightward direction and to provide operating force to the joystick lever 200 while maintaining an appropriate tension on the same.

When the driver operates the joystick lever 200 in the leftward-rightward direction, an appropriate amount of operating force is required. This operating force is provided by the motor 600.

The position of the joystick lever 200 needs to be controlled in proportion to the steering angle of the tires of the vehicle. In addition, the joystick lever 200 needs to be returned to the original position thereof in proportion to the degree to which the tires are turned to enable the vehicle to travel straight. The operating angle and the restoring angle of the joystick lever 200 are controlled by the motor 600.

In order to enhance the force of operating the joystick lever 200 and to provide a sense of clarity regarding the neutral position of the joystick lever 200, an elastic member and other separate components may be additionally provided.

The integrated control apparatus in some forms of the present disclosure further includes steering-sensor permanent magnets 710, one of which is coupled to an end of the steering hinge 400 and the other one of which is coupled to an end of a motor shaft 620, and a steering-sensor printed circuit board (PCB) 720, which is fixedly mounted in the lever housing 100 so as to face the steering-sensor permanent magnets 710.

When the joystick lever 200 is rotated in the leftward-rightward direction, the steering-sensor PCB 720 recognizes a change in magnetic flux depending on a change in position of the steering-sensor permanent magnets 710, and generates a steering-related signal.

In some forms of the present disclosure, two steering-sensor permanent magnets 710 are provided in order to exhibit a fail-safe function for safety and to secure robustness.

In addition, the integrated control apparatus in some forms of the present disclosure further includes a lever gear 730, which is rotatably coupled to the joystick lever 200 and meshes with the gentle acceleration lever 300 in an external gear form, a first acceleration-sensor permanent magnet 740, which is coupled to the lever gear 730, and an acceleration-sensor PCB 750, which is fixedly mounted to the joystick lever 200 so as to face the first acceleration-sensor permanent magnet 740.

When the gentle acceleration lever 300 is rotated, the acceleration-sensor PCB 750 recognizes a change in magnetic flux depending on a change in position of the first acceleration-sensor permanent magnet 740, and generates a signal related to gentle acceleration.

Because the rotational angle of the gentle acceleration lever 300, which is rotated about the lever hinge 310, is small, if the first acceleration-sensor permanent magnet 740 is mounted to the lever hinge 310, the acceleration-sensor PCB 750 may not easily recognize a change in position of the first acceleration-sensor permanent magnet 740.

Therefore, in some forms of the present disclosure, in order to increase the rotational angle of the gentle acceleration lever 300, the lever gear 730 is rotatably coupled to the joystick lever 200 and meshes with the gentle acceleration lever 300 in an external gear form, and the first acceleration-sensor permanent magnet 740 is coupled to the lever gear 730. Thereby, the acceleration-sensor PCB 750 is capable of easily recognizing a change in position of the first acceleration-sensor permanent magnet 740.

In addition, the integrated control apparatus in some forms of the present disclosure further includes a second acceleration-sensor permanent magnet 760, which is coupled to the acceleration hinge 500 and is mounted so as to face the acceleration-sensor PCB 750. When the joystick lever 200 is rotated in the forward-backward direction, the acceleration-sensor PCB 750 recognizes a change in magnetic flux depending on a change in position of the second acceleration-sensor permanent magnet 760, and generates one of an acceleration-related signal, a deceleration-related signal, and a braking-related signal.

In addition, the integrated control apparatus in some forms of the present disclosure further includes a main PCB 770, which is fixedly mounted in the lever housing 100 and controls the operation of the motor 600.

The main PCB 770 receives a steering-related signal transmitted from the steering-sensor PCB 720, and further receives an acceleration-related signal, a deceleration-related signal, and a braking-related signal transmitted from the acceleration-sensor PCB 750. Based thereon, the main PCB 770 transmits a CAN signal to an actuator of the vehicle through wiring, and the actuator of the vehicle operates in response to the signal transmitted from the main PCB 770.

In addition, the integrated control apparatus in some forms of the present disclosure further includes a lever pin 810, which is coupled to the lower end of the joystick lever 200 in the leftward-rightward direction, a carrier 820, which is rotatably coupled at one end thereof to the steering hinge 400 and has a groove 821 formed in a wave shape in the lower surface thereof that is in contact with the lever pin 810, and a carrier spring 830, which is mounted such that the two opposite ends thereof are supported by the steering hinge 400 and the carrier 820 and provides elastic force to the carrier 820 in order to maintain contact between the lever pin 810 and the groove 821.

The lever pin 810 penetrates the lower end of the joystick lever 200 in the leftward-rightward direction, and is coupled to the joystick lever 200 so as to be integrated therewith.

The steering hinge 400 has an empty space formed therein, and the inner space of the steering hinge 400 is open downwards. The carrier 820 and the carrier spring 830 are mounted in the inner space of the steering hinge 400.

The rear end of the carrier 820 is coupled to the steering hinge 400 via a carrier shaft 822 so as to be rotatable in an upward-downward direction with respect to the steering hinge 400. The groove 821, which is formed in a wave shape in the lower surface of the carrier 820, is in contact with the lever pin 810. The carrier spring 830 is implemented as a compression coil spring, and serves to provide elastic force to the carrier 820 so that the groove 821 in the carrier 820 is in contact with the lever pin 810 at all times.

When the joystick lever 200 is rotated in the forward-backward direction, an operational feeling and a feeling of moderation are generated by the lever pin 810 and the groove 821 in the carrier 820, which are in contact with each other, and the elastic force of the carrier spring 830. In particular, the elastic force of the carrier spring 830 acts as return force by which the joystick lever 200 is returned to the neutral position.

In some forms of the present disclosure, the joystick lever 200 may be mounted so as to be located on the left side or the right side of the driver.

In the case in which the joystick lever 200 is mounted on the left side of the driver, when the driver holds the joystick lever 200 with the left hand and pulls and rotates the joystick lever 200 toward the driver's body, a right directional signal (right turn signal) is generated, and when the driver pushes and rotates the joystick lever 200 in the opposite direction (direction away from the driver's body), a left directional signal (left turn signal) is generated.

The right directional signal or the left directional signal is generated by the steering-sensor PCB 720 recognizing a change in magnetic flux depending on a change in position of the steering-sensor permanent magnets 710 when the joystick lever 200 is rotated in the leftward-rightward direction.

On the contrary, in the case in which the joystick lever 200 is mounted on the right side of the driver, when the driver holds the joystick lever 200 with the right hand and pulls and rotates the joystick lever 200 toward the driver's body, a left directional signal (left turn signal) is generated, and when the driver pushes and rotates the joystick lever 200 in the opposite direction (direction away from the driver's body), a right directional signal (right turn signal) is generated.

As another example, the joystick lever 200 may be two in number, and the two joystick levers 200 may be mounted so as to be located on the left side and the right side of the driver. In this case, the driver may operate only the joystick lever 200 located on the left side, or may operate only the joystick lever 200 located on the right side. The two joystick levers 200 may be configured such that the joystick lever 200 that is not being operated by the driver is moved in conjunction with the joystick lever 200 that is being operated by the driver.

The integrated control apparatus in some forms of the present disclosure further includes shift buttons 910 provided in the lever housing 100. The shift buttons 910 may be implemented as button switches or tact switches that the driver presses with a finger to operate the same, and may include an R-stage button, an N-stage button, and a D-stage button.

When the driver presses and operates one of the shift buttons 910, the main PCB 770 mounted in the lever housing 100 generates a shift signal corresponding to the selected shift button.

As shown in FIG. 7, a first form of the present disclosure may be configured such that, when the driver pushes and rotates the joystick lever 200 forwards from the neutral position, acceleration is performed, such that, when the force of pushing the joystick lever 200 forwards is removed, the joystick lever 200 is returned to the neutral position and deceleration is performed, and such that, when the driver pulls and rotates the joystick lever 200 backwards from the neutral position, braking is performed.

When the driver rotates the joystick lever 200 rightwards from the neutral position, a right turn of the vehicle is performed, and when the driver rotates the joystick lever 200 leftwards from the neutral position, a left turn of the vehicle is performed.

As shown in FIG. 8, a second form of the present disclosure may be configured such that, when the driver pushes and rotates the joystick lever 200 forwards from the neutral position, forward acceleration is performed, such that, when the force of pushing the joystick lever 200 forwards is removed, the joystick lever 200 is returned to the neutral position and forward deceleration is performed, such that, when the driver pulls and rotates the joystick lever 200 backwards from the neutral position, backward acceleration is performed, and such that, when the force of pulling the joystick lever 200 backwards is removed, the joystick lever 200 is returned to the neutral position and backward deceleration is performed.

When the driver rotates the joystick lever 200 rightwards from the neutral position, a right turn of the vehicle is performed, and when the driver rotates the joystick lever 200 leftwards from the neutral position, a left turn of the vehicle is performed.

In the case in which, when the driver pulls and rotates the joystick lever 200 backwards from the neutral position, backward acceleration is performed, as shown in FIG. 8, an emergency brake button 920, which is operated by the driver for braking of the vehicle, may be separately provided in the lever housing 100. When the driver presses and operates the emergency brake button 920, the main PCB 770 mounted in the lever housing 100 generates a braking-related signal.

A brake pedal for braking may be provided in the vehicle in place of the emergency brake button 920.

As is apparent from the above description, an integrated control apparatus for driving a vehicle in some forms of the present disclosure is applied to an autonomous vehicle, and is directly operated and used by a driver when the driver drives the vehicle in a manual driving mode. In addition, the integrated control apparatus enables acceleration, deceleration, braking, and steering of the vehicle through simple operation of a joystick lever by the driver. In addition, the driver is capable of easily and conveniently operating the integrated control apparatus.

Although exemplary forms of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An integrated control apparatus for driving a vehicle, the integrated control apparatus comprising:
   a lever housing mounted in an interior space of the vehicle;
   a joystick lever coupled to the lever housing and configured to be rotatable in a forward-backward direction and a leftward-rightward direction;
   an acceleration lever coupled to the joystick lever and configured to be rotatable in the forward-backward direction;
   a steering hinge coupled to the lever housing and configured to be rotatable in the leftward-rightward direction;
   a plurality of steering-sensor permanent magnets, wherein a first steering-sensor permanent magnet is coupled to an end of the steering hinge and a second steering-sensor permanent magnet is coupled to an end of a motor shaft of a motor; and
   a steering-sensor printed circuit board (PCB) fixedly mounted in the lever housing and configured to:

face the plurality of steering-sensor permanent magnets;

when the joystick lever is rotated in the leftward-rightward direction, recognize a change in magnetic flux depending on a change in position of the plurality of steering-sensor permanent magnets; and generate a steering-related signal, wherein, when the gentle-acceleration lever is operated, an acceleration signal of the vehicle is generated, wherein, when the joystick lever is operated, one of an additional acceleration signal, a deceleration signal, a steering signal, or a braking signal of the vehicle is generated, and wherein the joystick lever is connected to the steering hinge and is rotated in the leftward-rightward direction together with the steering hinge against the lever housing.

2. The integrated control apparatus of claim 1, further comprising:

an acceleration hinge coupled to the steering hinge and configured to be rotatable in the forward-backward direction, wherein the joystick lever is connected to the acceleration hinge and is rotated in the forward-backward direction together with the acceleration hinge against the steering hinge.

3. The integrated control apparatus of claim 2, further comprising:

the motor connected to the steering hinge via a reduction gear and configured to provide operating force and reaction force when the joystick lever is rotated in the leftward-rightward direction.

4. The integrated control apparatus of claim 1, further comprising:

a lever gear rotatably coupled to the joystick lever and configured to mesh with the acceleration lever in an external gear form;

a first acceleration-sensor permanent magnet coupled to the lever gear; and an acceleration-sensor printed circuit board (PCB) fixedly mounted to the joystick lever and configured to face the first acceleration-sensor permanent magnet, wherein the acceleration-sensor PCB is configured to:

when the acceleration lever is rotated, recognize a change in magnetic flux depending on a change in position of the first acceleration-sensor permanent magnet; and generate a signal related to acceleration.

5. The integrated control apparatus of claim 4, further comprising:

a second acceleration-sensor permanent magnet coupled to the acceleration hinge, the second acceleration-sensor permanent magnet being mounted to face the acceleration-sensor PCB, wherein the acceleration-sensor PCB is configured to:

when the joystick lever is rotated in the forward-backward direction, recognize a change in magnetic flux depending on a change in position of the second acceleration-sensor permanent magnet; and generate one of an acceleration-related signal, a deceleration-related signal, or a braking-related signal.

6. The integrated control apparatus of claim 5, further comprising:

a main printed circuit board (PCB) fixedly mounted in the lever housing, wherein the main PCB is configured to:

control operation of the motor;

receive signals from the steering-sensor PCB and the acceleration-sensor PCB; and transmit the signals to an actuator of the vehicle.

7. The integrated control apparatus of claim 1, further comprising:

a lever pin coupled to a lower end of the joystick lever in the leftward-rightward direction;

a carrier rotatably coupled at one end of the carrier to the steering hinge, the carrier having a groove formed in a wave shape in a lower surface of the carrier that is in contact with the lever pin; and a carrier spring configured to provide elastic force to the carrier to maintain contact between the lever pin and the groove, wherein two opposite ends of the carrier spring are supported by the steering hinge and the carrier.

8. The integrated control apparatus of claim 1, further comprising:

a shift button provided in the lever housing, wherein, when a driver presses and operates the shift button, a main printed circuit board (PCB) mounted in the lever housing is configured to generate a shift signal corresponding to the pressed shift button.

9. The integrated control apparatus of claim 1, wherein:

when the joystick lever is pushed and rotated forwards from a neutral position, acceleration is performed, when a force of pushing the joystick lever forwards is removed, the joystick lever is returned to the neutral position and deceleration is performed, and when the joystick lever is pulled and rotated backwards from the neutral position, braking is performed.

10. The integrated control apparatus of claim 1, wherein:

when the joystick lever is pushed and rotated forwards from a neutral position, forward acceleration is performed, when a force of pushing the joystick lever forwards is removed, the joystick lever is returned to the neutral position and forward deceleration is performed, when the joystick lever is pulled and rotated backwards from the neutral position, backward acceleration is performed, and when a force of pulling the joystick lever backwards is removed, the joystick lever is returned to the neutral position and backward deceleration is performed.

11. The integrated control apparatus of claim 10, wherein:

when the joystick lever is pulled and rotated backwards from the neutral position and the backward acceleration is performed, an emergency brake button operated by a driver for braking of the vehicle is separately provided in the lever housing, and when the driver presses and operates the emergency brake button, a main printed circuit board (PCB) mounted in the lever housing is configured to generate a braking-related signal.

12. An integrated control apparatus for driving a vehicle, the integrated control apparatus comprising:

a lever housing mounted in an interior space of the vehicle;

a joystick lever coupled to the lever housing and configured to be rotatable in a forward-backward direction and a leftward-rightward direction; and an acceleration lever coupled to the joystick lever and configured to be rotatable in the forward-backward direction, a lever pin coupled to a lower end of the joystick lever in the leftward-rightward direction;

a carrier rotatably coupled at one end of the carrier to a steering hinge, the carrier having a groove formed in a wave shape in a lower surface of the carrier that is in contact with the lever pin; and a carrier spring configured to provide elastic force to the carrier to maintain contact between the lever pin and the groove, wherein two opposite ends of the carrier spring are supported by the steering hinge and the carrier, wherein, when the acceleration lever is operated, an acceleration signal of the vehicle is generated, and wherein, when the joystick lever is operated, one of an additional acceleration signal, a deceleration signal, a steering signal, or a braking signal of the vehicle is generated.

\* \* \* \* \*